(12) United States Patent
Teodosiu et al.

(10) Patent No.: US 7,643,491 B2
(45) Date of Patent: Jan. 5, 2010

(54) SCHEDULING CONNECTIONS BETWEEN PEERS IN A PEER-TO-PEER FILE SHARING ENVIRONMENT

(75) Inventors: Dan Teodosiu, Kirkland, WA (US); Philip A. Chou, Bellevue, WA (US); Alexandra Heron, Kirkland, WA (US); Cheng Huang, Redmond, WA (US); Tom Kleinpeter, Redmond, WA (US); Jin Li, Sammamish, WA (US); Eyal Schwartz, Bellevue, WA (US); John T Spivey, Redmond, WA (US); David C. Steere, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 595 days.

(21) Appl. No.: 11/275,177

(22) Filed: Dec. 16, 2005

(65) Prior Publication Data

US 2007/0206610 A1    Sep. 6, 2007

(51) Int. Cl.
*H04L 12/28*    (2006.01)
(52) U.S. Cl. .................... 370/395.2; 370/400
(58) Field of Classification Search .............. 370/395.2, 370/95.21, 395.4, 395.42, 350, 400, 503
See application file for complete search history.

(56) References Cited

U.S. PATENT DOCUMENTS

| | | | |
|---|---|---|---|
| 5,884,037 A * | 3/1999 | Aras et al. ................. 709/226 |
| 6,901,415 B2 * | 5/2005 | Thomas et al. .............. 707/203 |
| 7,023,876 B2 * | 4/2006 | Berry et al. ................. 370/465 |
| 7,403,498 B2 * | 7/2008 | Abrol et al. ................. 370/324 |
| 2002/0184358 A1 * | 12/2002 | Traversat et al. ............ 709/223 |
| 2003/0018726 A1 * | 1/2003 | Low et al. ................... 709/206 |
| 2003/0055908 A1 * | 3/2003 | Brown et al. ................ 709/207 |
| 2003/0081748 A1 * | 5/2003 | Lipinski ................ 379/201.02 |
| 2003/0088623 A1 * | 5/2003 | Kusuda ...................... 709/204 |
| 2003/0135552 A1 * | 7/2003 | Blackstock et al. ......... 709/205 |
| 2003/0187868 A1 * | 10/2003 | Igarashi ..................... 707/102 |
| 2003/0191828 A1 * | 10/2003 | Ramanathan et al. ....... 709/221 |
| 2006/0177044 A1 * | 8/2006 | O'Neil et al. .......... 379/373.02 |

* cited by examiner

*Primary Examiner*—Chirag G Shah
*Assistant Examiner*—Daniel Mitchell
(74) *Attorney, Agent, or Firm*—Lee & Hayes, PLLC

(57) ABSTRACT

Various embodiments can utilize a distributed solution for scheduling connections between peers in a file sharing environment. In accordance with at least some embodiments, individual nodes in a peer-to-peer system include scheduling software that enables the nodes to make scheduling decisions with regard to how, when and where connections are made with other peers. Scheduling decisions can be based on a number of different parameters. In at least some embodiments, a synchronization negotiation manager is embodied with logic that drives the negotiation and scheduling process. This logic is represented by an innovative state machine that is designed to implement the negotiation and synchronization process.

17 Claims, 5 Drawing Sheets

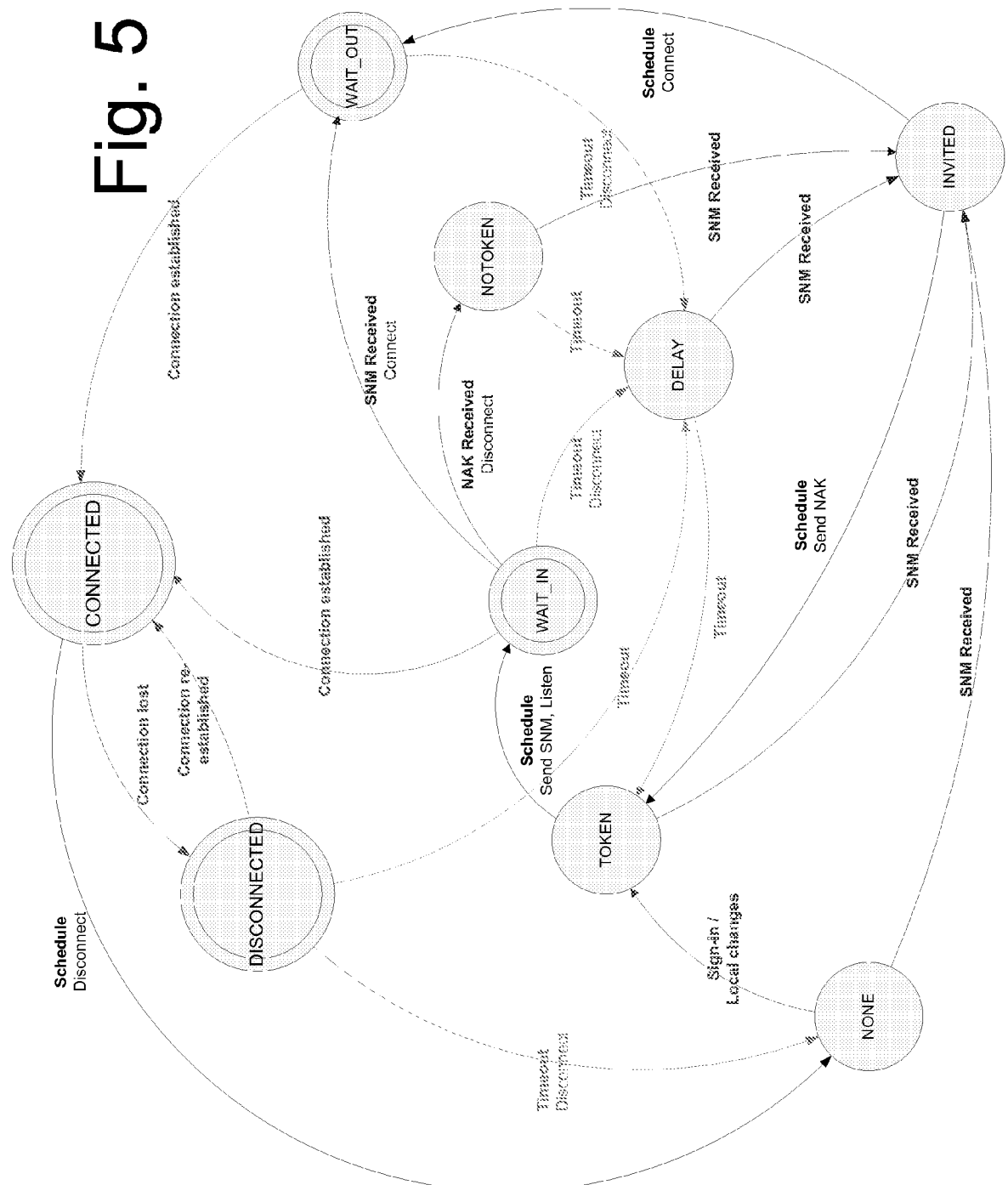

SCHEDULING CONNECTIONS BETWEEN PEERS IN A PEER-TO-PEER FILE SHARING ENVIRONMENT

BACKGROUND

As the popularity of sharing files in a peer-to-peer environment grows, so too does the challenge of providing sharing environments that enable users to share files in an efficient manner, while at the same time taking steps to ensure that the overall progress of the file sharing process moves forward.

SUMMARY

Various embodiments can utilize a distributed solution for scheduling connections between peers in a file sharing environment. In accordance with at least some embodiments, individual nodes in a peer-to-peer system include scheduling software that enables the nodes to make scheduling decisions with regard to how, when and where connections are made with other peers. Scheduling decisions can be based on a number of different parameters.

In at least some embodiments, a synchronization negotiation manager is embodied with logic that drives the negotiation and scheduling process. This logic is represented by an innovative state machine that is designed to implement the negotiation and synchronization process.

BRIEF DESCRIPTION OF THE DRAWINGS

FIG. 5 is a state diagram that describes logic that can be implemented in accordance with one embodiment.

DETAILED DESCRIPTION

Overview

Various embodiments can utilize a distributed solution for scheduling connections between peers in a file sharing environment. In accordance with at least some embodiments, individual nodes in a peer-to-peer system include scheduling software that enables the nodes to make scheduling decisions with regard to how, when and where connections are made with other peers. Scheduling decisions can be based on a number of different parameters including, by way of example and not limitation, various pre-computed parameters, activity type taking place between the nodes, load on the node/device and network connection, and time between synchronizations between nodes and/or connection priority.

In at least some embodiments, a synchronization negotiation manager is embodied with logic that drives the negotiation and scheduling process. This logic is represented by an innovative state machine that is designed to implement the negotiation and synchronization process.

Before describing the various embodiments in detail, a discussion of two exemplary file-sharing environments is provided to give the reader some context as to how the inventive embodiments can be employed. It is to be appreciated and understood that these exemplary file-sharing environments constitute but examples of environments in which the techniques described in this document can be implemented. It is to be appreciated and understood that other environments can be utilized without departing from the spirit and scope of the claimed subject matter.

Exemplary File Sharing Environments

In the discussion that follows, two exemplary file sharing environments are described—a 2-Share environment and a circle share environment.

Figure 1:
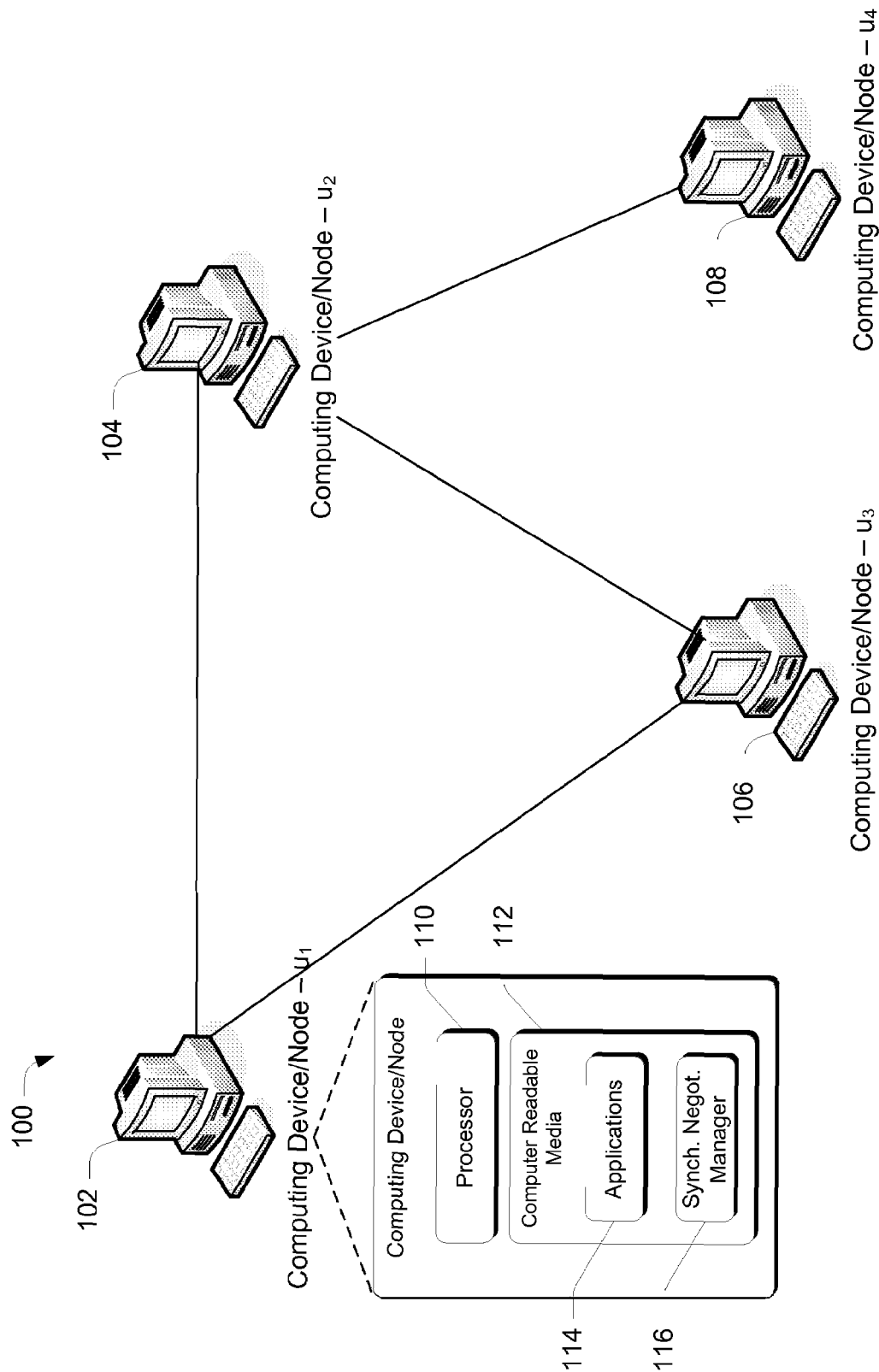
FIG. 1 illustrates one exemplary file sharing environment in which the inventive principles can be employed in one embodiment.

2-Share FIG. 1 illustrates an exemplary sharing environment generally at 100. In this illustration, only the client computing devices or nodes are shown. Accordingly, the network through which the nodes communicate as well as any related servers are not illustrated.

In this example, a number of devices or nodes 102, 104, 106 and 108 are shown. Each node is associated with a particular user so, for example, node 102 is associated with user 1 or $u_1$, node 104 is associated with user 2 or $u_2$, and so on. Each device typically includes one or more processors 110 and one or more computer-readable media 112 on which reside one or more different applications 114 which are executable by processor 110. In this particular example, a synchronization negotiation manager 116 is provided in the form of computer-readable instructions that reside on the computer-readable media and are executable by processor 110. The synchronization negotiation manager 116 can comprise part of an application 114, or it can reside in the form of a standalone component.

In this example, user $u_1$ has sharing relationships with users $u_2$ and $U_3$, respectively; user $u_2$ has sharing relationships with users $u_1$, $u_3$ and $u_4$, respectively; user $u_3$ has sharing relationships with users $u_1$ and $u_2$, respectively; and user $U_4$ has a sharing relationship with user $u_2$.

The file sharing relationships between users can be implemented via an application 114 executing on the computing device. Any suitable application can implement the file-sharing functionality. In but one embodiment, the file-sharing functionality can be provided by an application that enables the users to communicate with one another such as an email application or a messenger application, such as Microsoft's Windows® Live Messenger.

In this example, each user has an individual sharing relationship with other users that permits them to exchange files or updated portions of files. So, for example, user $u_2$ has a sharing relationship with three other users. Thus, it is conceivable that at any one time all of those other three users may be on line at a time when user $u_2$ is on line. If user $u_2$'s computing device can only entertain a file exchanging connection with two other users, then this has ramifications with regard to who is connected and when. In this scenario, synchronization negotiation manager 116 works to reduce the chance that user $u_2$'s uplinks and downlinks will saturate, as well as to maintain forward progress of the sharing relationships (i.e. making sure that eventually all users are able to synchronize), as will become apparent below.

Circle Share

Figure 2:
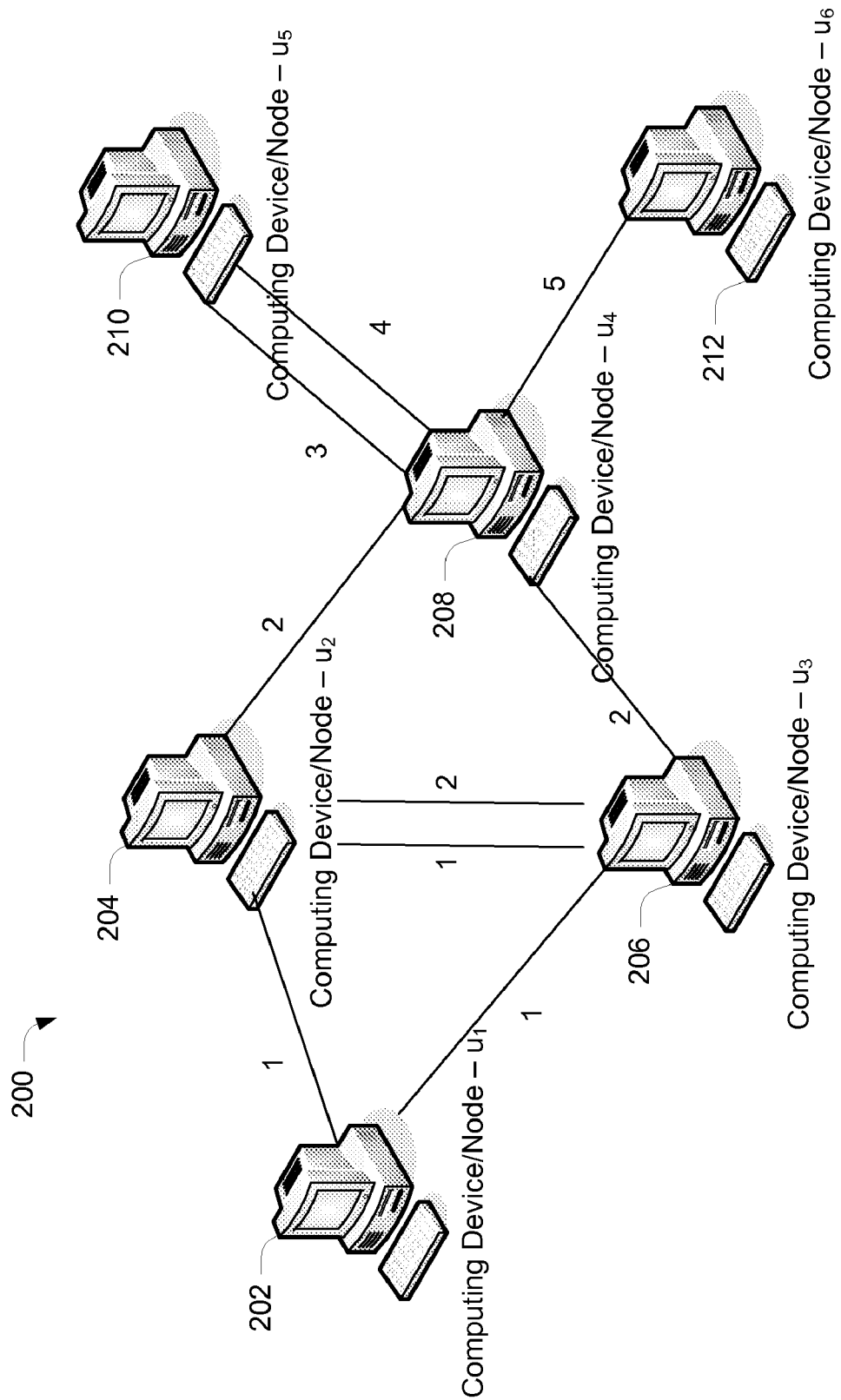
FIG. 2 illustrates one exemplary file sharing environment in which the inventive principles can be employed in one embodiment.

FIG. 2 illustrates another sharing environment known as a circle share. Here, the sharing relationship can be categorized as a multigraph in which between any two nodes there can be multiple sharing relationships. More specifically, in this example, individual circles or groups are designated by a line extending between individual nodes in the group and bearing a numerical designation. Thus, a first circle or group (bearing "1" as a designator) is comprised of nodes 202, 204 and 206. A second circle or group (bearing "2" as a designator) is comprised of nodes 204, 206 and 208, and so on. In this example, a circle or group might be defined as "My Soccer Friends", "Dog Lovers of Seattle", "My Family" and the like.

Given the nature of the circle share and the fact that many users can belong to a particular circle, negotiating and scheduling file sharing activities can be particularly challenging, given the desire to avoid connection saturation, while at the same time advance file sharing activities.

Peer-to-Peer File Sharing

Against the backdrop of the two file sharing environments, consider the following. The peer-to-peer file sharing system, whose but one embodiment can be an instant messaging system, utilizes the notion of presence. Presence essentially refers to knowledge of when a person or "buddy" is on line. An exemplary system is described in co-pending U.S. patent application Ser. No. 11/157,187, filed on Jun. 20, 2005.

Assume that two users have a sharing relationship. Thus, when one user comes on line, as part of the notion of presence, a presence service sends the other user's computing device some information which includes the fact that the first user is on line, along with other information that pertains to the type of connection that the first use has, the type of device that the first user is using, and information that is utilized to ascertain whether the two users can or need to synchronize any shared files.

Typically, presence, connection and device characteristics can be maintained by a server because this type of information tends to change relatively infrequently. The information that pertains to whether users need to or should synchronize can tend to change relatively frequently. Accordingly, it is more economical from the server's standpoint to have this information maintained by the individual devices or nodes.

In one embodiment, the presence service can be implemented by a centralized server or set of servers. In an alternate embodiment, the presence service can be implemented in a purely peer-to-peer manner.

In the example that follows, a scheduling paradigm is employed that has a number of goals. First, scheduling should be accomplished in a manner that is directed to ensuring that no node has more than a given number of incoming and outgoing connections. The number of incoming and outgoing connections is determined dynamically based on the node characteristics, such as the load on the machine, network characteristics (e.g. modem or broadband connection and the like), or the history of past connection characteristics such as average transfer speed to a given buddy or set of buddies. Second, scheduling should be accomplished in a manner that is directed to ensuring that no starvation takes place. That is, if there is any content that needs to be synchronized between users, it will eventually be synchronized. More specifically, if any two machines need to communicate, then they will eventually communicate. Third, scheduling should take place in a manner that is directed to reducing the staleness of the content that needs to be synchronized. Specifically, this goal is directed to making sure that the average age of the content that needs to be synchronized is as small as possible. Essentially then, from a scheduling standpoint, one wants to maximize throughput and at the same time minimize the backlog (i.e. the time between synchronizations between users).

Figure 3:
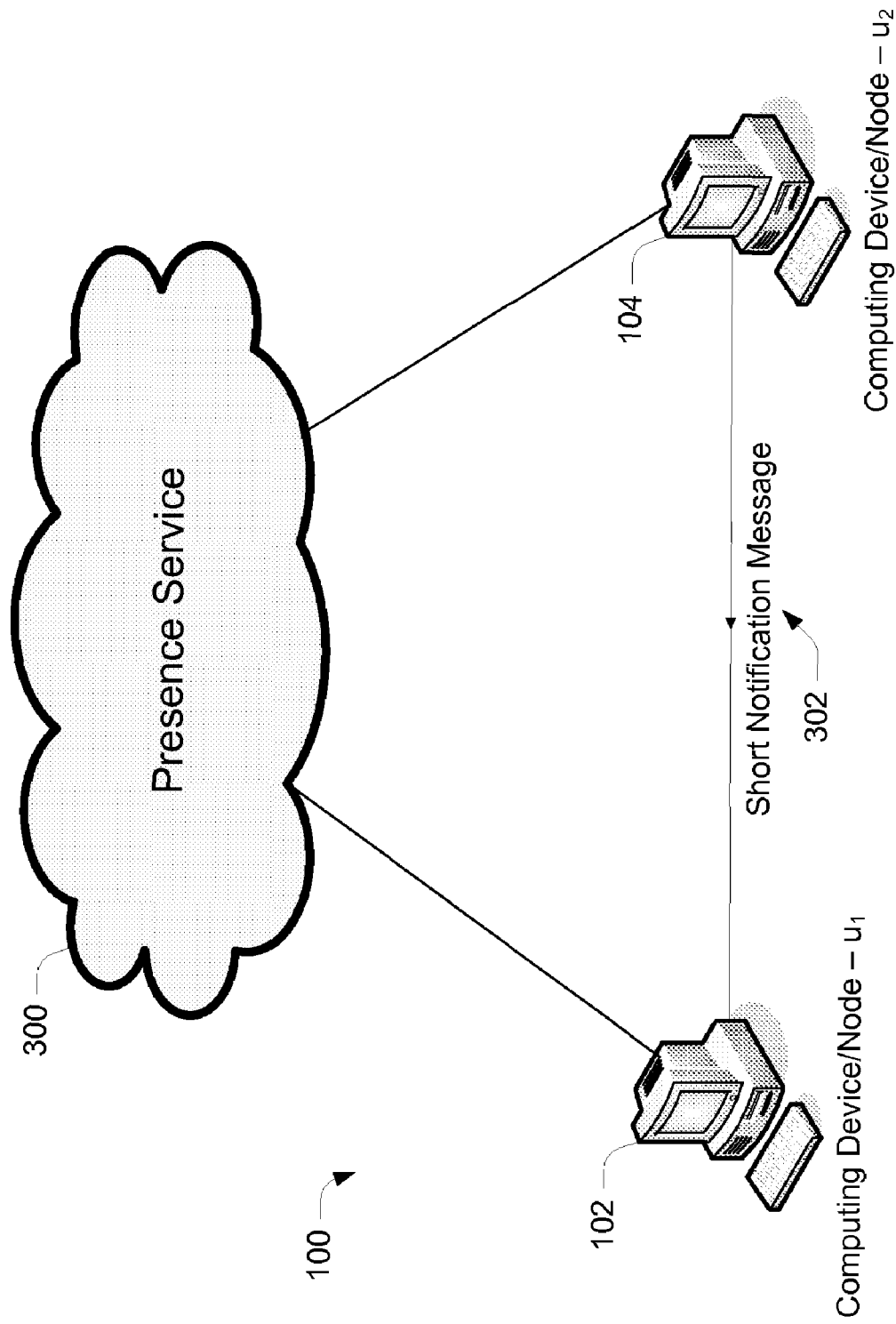
FIG. 3 illustrates two users from the FIG. 1 illustration in accordance with one embodiment.

Consider now FIG. 3 and two users from the FIG. 1 example that have a sharing relationship—user $u_1$ (node 102) and user $u_2$ (node 104). Assume that user $u_1$ is on line and user $u_2$ logs in. When user $u_2$ logs in, presence information is sent to user $u_1$ by the presence service 300. As mentioned previously, the presence service 300 may be implemented either by a centralized set of servers, or in a peer-to-peer fashion between the nodes 102 and 104. At this point, nodes 102 and 104 need to negotiate whether synchronization between themselves is required. The information exchange between nodes 102 and 104 takes place through a short notification message 302 which is a relatively lightweight, non-bandwidth-intensive interaction between the nodes. A short notification message can either represent an invitation to connect and synchronize (in which case we shall denote it as an "SNM"), or a negative acknowledgement, or refusal, to establish a connection and synchronize at this point in time (in which case we shall denote it as a "NAK"). Although FIG. 3 only depicts one direction for the short notification message 302, short notification messages can be sent by either node, and thus in either direction. In one embodiment, short notification message 302 is sent through the presence service 300; in an alternate embodiment, short notification message 302 may be sent in a peer-to-peer fashion directly between nodes 102 and 104.

One of the pieces of information that user $u_1$ would like to receive is that which would enable user $u_1$ to ascertain whether he or she needs to synchronize with user $u_2$. That is, user $u_1$ would like to find out what files user $u_2$ has, and whether there are any new or differently-versioned files that need to be synchronized. To perform the actual synchronization, user $u_1$'s node 102 begins negotiating with user $u_2$'s node 104 in view of establishing a more heavyweight connection through which synchronization can take place. The heavyweight connection is one that is established through a peer-to-peer layer and can include by way of example and not limitation, a TCP connection, a UDP connection, an HTTP connection, a connection relayed through a server, and the like.

To initiate the connection negotiation process, user $u_1$'s device 102 sends an invitation to synchronize (or SNM) 302 to user $u_2$'s device 104. When user $U_2$'s device 104 receives this SNM 302, it evaluates whether it can make a heavyweight connection with user $u_1$'s device 102. For example, user $u_2$ may have 100 or more sharing relationships. Accordingly, user $u_2$'s device 104 must now determine with whom (if anyone) it can connect.

Thus, to undertake this analysis in accordance with one embodiment, user $U_2$'s device takes into account and considers a number of different parameters including by way of example and not limitation, various pre-computed parameters, activity type taking place between the nodes, load on the node/device and network connection, time between synchronizations between nodes and/or connection priority, previous synchronization performance history with user $u_1$, whether nodes 102 and 104 are located on the same LAN, network proximity as approximated through the number of shared DNS subdomains in node 102's and node 104's host names, and the like.

If user $u_2$'s device 104 determines that it can economically make or allow a connection for file synchronization, a connection is established between the users' devices 102 and 104. If, on the other hand, user $u_2$'s device 104 determines that it cannot entertain a connection at this time (perhaps because it already has the maximum number of connections open), it sends to user $u_1$'s device a NAK short notification message 302 which rejects the invitation to synchronize. The NAK 302 also informs user $u_1$ that user $u_2$ will attempt to synchronize at a later time.

Assume now that time passes and one of user $u_2$'s connections goes away, user $u_2$ can now communicate with user $u_1$ and invite user $u_1$ to synchronize. During the synchronization negotiation, a token is utilized that maintains a count of how often users have tried to contact each other to synchronize. If the token reaches a predetermined limit, a connection may be forced to ensure that files do get eventually synchronized.

When user $u_1$'s device 102 receives the invitation to negotiate, it evaluates its situation in terms of the parameters mentioned above and makes a decision as to whether it can synchronize with user $u_2$'s device 104. At this point, it can either make a connection with user $u_2$'s device 104 to start synchronizing, or it can send a NAK 302 back to user 2's device 104 which declines the invitation and informs user $u_2$'s device 104 that it needs to send an invitation when it is not busy—and the process repeats.

Exemplary Parameters

As noted above, in accordance with one embodiment, various parameters are utilized by the individual devices to evaluate and ascertain whether a file sharing connection can and/or should be established. Various exemplary parameters are provided below and constitute but specific examples of parameters that can be utilized. It is to be appreciated and understood that other parameters can be utilized without departing from the spirit and scope of the claimed subject matter.

Pre-Computed Parameters

In accordance with one embodiment, various pre-computed parameters can be utilized. These parameters can change from time to time depending on, for example, the computing device through which the user connects. In accordance with one embodiment, pre-computed parameters can include, by way of example and not limitation, the number of incoming connections, the number of outgoing connections, and the number of times a token is passed back and forth representing synchronization attempts.

In practice, the upstream bandwidth may be smaller than the downstream bandwidth. Accordingly, from an economical standpoint, it can be more advantageous to have a smaller number of outgoing connections than incoming connections.

Type of Activity

In accordance with one embodiment, the type of activity that is taking place between the individual users can be considered in determining whether to make a file sharing connection. For example, one type of activity pertains to whether the users between which a file sharing connection is seeking to be established are actively engaging one another. As an example, consider the following. Assume that two users are instant messaging one another, taking part in voice or audio conversation with one another, emailing one another, or gaming with one another, to name just a few. In this case, it can be advantageous to give priority to a file-sharing connection between these two users because it logically follows that these users may wish, in the context of their interaction with one another, to participate in file sharing activities.

Load on Device/Network Connection

In accordance with one embodiment, the load on the user's device and/or network connection can be considered in determining whether to establish a file sharing connection. In this embodiment, each device determines its own load. In considering its own load, a device can consider such things as CPU overhead, memory usage, disk and network utilization and the like. In practice, operating systems typically have a set of well-defined APIs that can expose this information to an application running on the device. By taking these parameters into consideration when determining whether or not to establish a file-sharing connection, a device can take steps to mitigate adverse performance-impacting ramifications associated with establishing a file sharing connection.

Synchronization Staleness

In accordance with one embodiment, the synchronization staleness can be considered. This parameter essentially looks at how long it has been since two users synchronized their files. In implementation, a timestamp can be used to track staleness.

Connection Priority

In accordance with one embodiment, connection priority can be utilized in determining whether a connection should be established. In this embodiment, the notion of a token carrying a numeric value can be employed to track how many times attempts have been made to synchronize between users. For every unsuccessful attempt, the numeric value of the token is incremented. Once the numeric value of the token reaches a pre-determined threshold, the connection priority can be increased. In addition, this parameter can consider what type of activity is going on between the users, examples of which are given above.

Network Proximity

In accordance with one embodiment, the network proximity of the devices can be considered. This parameter looks at how close in a network sense the devices are. Devices that are closer to each other are more likely to have a higher bandwidth and lower latency connection available, and will thus be able to synchronize faster. In accordance with one embodiment, network proximity parameters can include, by way of example and not limitation, whether the devices are on the same LAN, or the number of shared or identical subdomains in the devices' DNS names.

Previous Synchronization History

In accordance with one embodiment, the previous synchronization history with a given device can be considered. This parameter tries to predict the synchronization bandwidth and latency based on historical data computed based on past synchronizations and stored on the devices. It is likely that synchronizations between devices that had good bandwidth or latency in the past will have the same characteristics in the future, thus in accordance to one embodiment these types of connections may be given higher priority.

Exemplary Method

Figure 4:
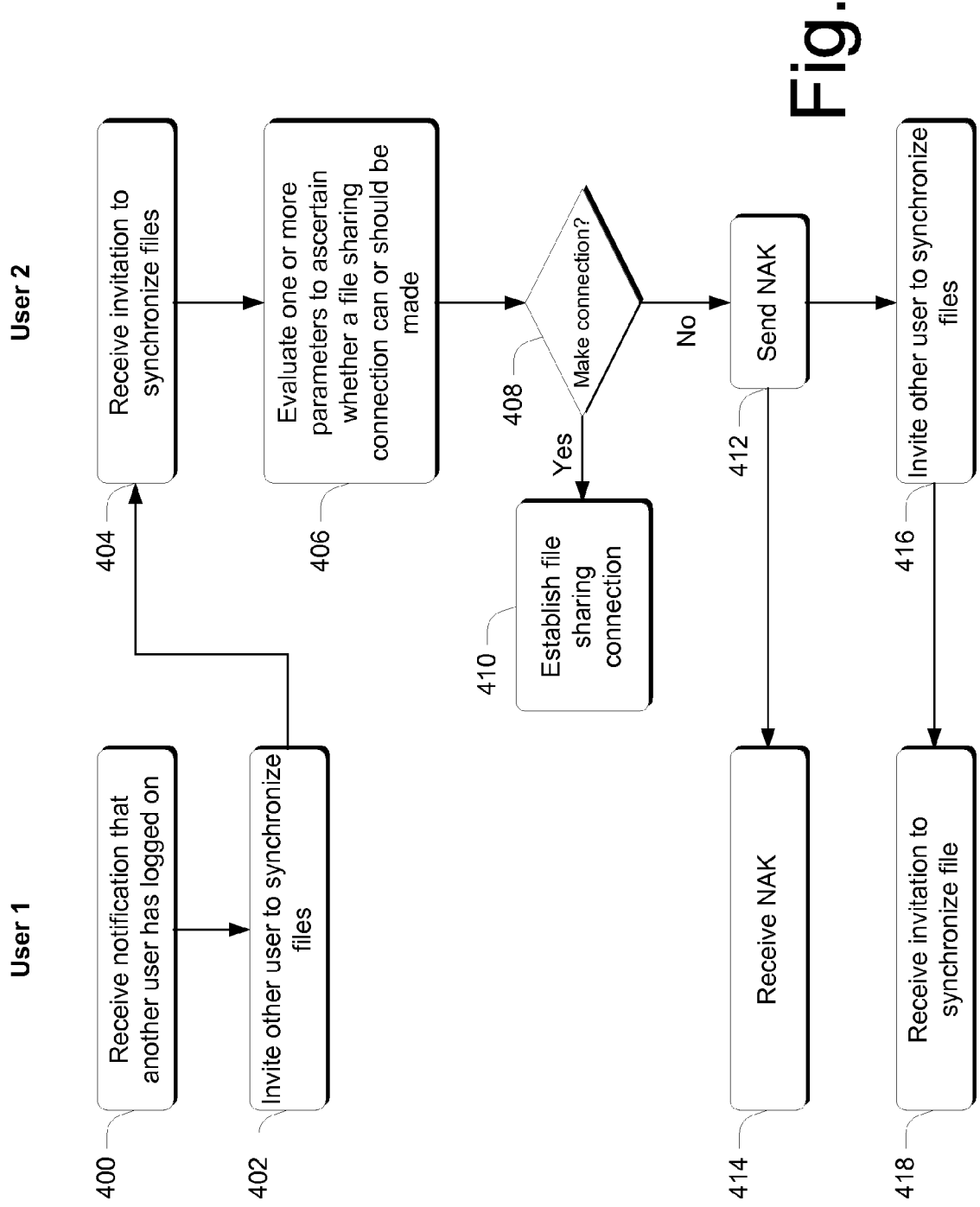
FIG. 4 is a flow diagram that describes steps in a method in accordance with one embodiment.

FIG. 4 is a flow diagram that describes steps in a synchronization/negotiation method in accordance with one embodiment. The method can be implemented in connection with any suitable hardware, software, firmware or combination thereof. In but one embodiment, the method can be implemented in software by, for example, a synchronization negotiation manager component such as the one illustrated and described in FIG. 1.

Step 400 receives a notification that another user with whom one has a file sharing relationship has logged on. In this example, the notification is received using a presence service that tracks users' presence. In this example, user 1 receives the notification that user 2 has logged on.

Responsive to receiving the notification, step 402 invites the other user (user 2) to synchronize files using a relatively lightweight mechanism such as a SNM short notification message. Step 404 receives the invitation to synchronize files. Step 406 evaluates one or more parameters to ascertain whether a file sharing connection can or should be made. Examples of parameters that can be considered are given above.

If, at step 408, the evaluation performed in step 406 indicates that a connection can be made, then step 410 establishes a file sharing connection with user 1 and file sharing activities can commence. If, one the other hand, step 408 determines that a connection should not or cannot be made, step 412 sends a NAK short notification message to user 1 and informs user 1 that it will send an invitation at a later time. Step 414 receives the NAK short notification message.

At some later time, step 416 invites the other user (user 1) to synchronize files by sending an SNM short notification message. This step can be performed when, for example, user 2's computing device is no longer busy or has the available bandwidth. Step 418 receives the invitation to synchronize files and can perform an analysis such as that described in steps 406 and 408.

In at least some embodiments, a token containing a numeric value can be utilized to ensure that after a predetermined number of synchronization attempts, a file sharing connection is established between the users.

Synchronization Negotiation Manager

In one embodiment, the synchronization negotiation manager oversees and manages the number of concurrent connections a node has open at one time. It achieves this by managing all synchronization invitations and connections as described above.

FIG. 5 is a state diagram that illustrates and describes one example of logic that can be implemented by the synchronization negotiation manager in accordance with one embodiment. In the discussion that follows, the inputs and outputs to the synchronization negotiation manager are first discussed, followed by a discussion and definition of the various states in the diagram. Following this, a discussion of how the synchronization negotiation manager operates is provided.

Inputs/Actions

In this state diagram there are a number of inputs (shown in bold font) and actions (shown in light font). In the discussion that follows, the term "buddy" is used to identify an entity with which a sharing relationship exists.

In this particular example, the inputs include by way of example and not limitation:

| Input | Definition |
| --- | --- |
| Sign-in/Local changes | Spawned by the presence service notifying when a buddy signs in, or local changes on the file system. |
| Schedule | Spawned by a scheduling action of the synchronization negotiation manager that evaluates whether to accept invitations and establish new connections, or whether to disconnect existing connections. |
| SNM Received | Indicates that a synchronization invitation SNM has been received. |
| NAK Received | Indicates that a NAK has been received |
| Connection lost | Called when a connection to a buddy has been terminated or lost. |
| Connection established | Called when a connection to a buddy has been established. |
| Connection re-established | Called when a previously established connection to a buddy that was lost or terminated before synchronization could complete has been reestablished. |
| Timeout | Indicates that a state has reached the maximum allowed time and an action and state transition needs to be performed. |

In this particular example, the actions include by way of example and not limitation:

| Action | Definition |
| --- | --- |
| Send SNM | Sends a SNM synchronization negotiation message to a buddy. |
| Send NAK | Sends a NAK synchronization negotiation message to a buddy. |
| Listen | Configures the node to listen for and accept incoming connections on a content set. |
| Connect | Configures the node for connections on a content set, and schedules an outgoing connection. |
| Disconnect | Drops any open connections on a content set and removes the connection configuration. |

States

In the illustrated state diagram, the following states are utilized and discussed just below: NONE, TOKEN, NOTOKEN, INVITED, WAIT_IN, WAIT_OUT, CONNECTED, DISCONNECTED, and DELAY.

NONE

A request is put into this state when the buddy with whom the local user is synchronizing goes offline or is fully synchronized. The NONE states will periodically be pruned and discarded. A request will leave this state when a new SNM has been received from this buddy moving the request to the INVITED state, or a buddy signs in and the local user has changes for them, moving the request to the TOKEN state which will queue the sending of a SNM.

TOKEN

All local synchronization invitations are queued in this state to be sent to the appropriate remote user when there is new local content available and the remote user is signed in.

A synchronization request enters this state in 3 ways: (1) from the NONE state—a buddy signs in and you have local changes for them; (2) from the INVITED state—the local user received an SNM from a buddy, but was busy so a NAK was sent; moving to TOKEN will schedule another SNM to be sent by the local user; and (3) from the DELAY state—if a connection has timed out, then it moves to the DELAY state. If an SNM is received while in the DELAY state then it will move to the TOKEN state.

A synchronization request leaves this state in 2 ways: (1) to INVITED state—if while in the TOKEN state a SNM is received from the same user that you are waiting to schedule a connection to, then the request will move from the TOKEN to the INVITED state; and (2) to WAIT_IN state—in moving from TOKEN to WAIT_IN the local client will send a SNM message to their buddy and start listening for a connection. The request will stay in the WAIT_IN state to listen for an incoming connection from the user.

NOTOKEN

A synchronization request enters this state if a NAK is received from a buddy, in response to an SNM sent by the local user. In this state the local user is waiting for a timeout or for an invitation to synchronize (i.e., an SNM message) from the buddy.

A request leaves this state in 2 ways: (1) goes to DELAY—when a request enters this state from TOKEN it is because the request has timed out, i.e. the local user has been waiting for too long for the buddy to send an SNM; and (2) goes to INVITED—once a user receives a NAK it is up to the buddy that sent the NAK to send a subsequent SNM. Once the local user receives the SNM, the request moves to the INVITED state.

INVITED

This state is entered briefly while waiting for the scheduler to approve or deny a connection. There are four ways to enter this state: (1) from TOKEN—a request enters INVITED from TOKEN when an SNM has been received from the remote user while a synchronization invitation was queued for that same user; (2) from DELAY—if a request has timed out and then a synchronization negotiation message is received from the buddy, then the request moves from the DELAY state to the INVITED state to wait for scheduling; (3) from NOTOKEN—a request moves from NOTOKEN to INVITED when an SNM message has been received from the buddy, who previously sent a NAK; and (4) from NONE—a request moves from NONE to INVITED when an incoming SNM message is received from the buddy.

A request leaves this state in two ways when the scheduler either approves or denies the request for a connection: (1) to WAIT_OUT—this is the state the connection goes to when it has been approved. This will result in the local user trying to connect to the remote user; and (2) to TOKEN—this is the state the connection goes to when the scheduler denies it; a NAK is sent to the remote user. By moving to TOKEN, it is now up to the local user to send an SNM message to the remote user when they are no longer busy.

WAIT IN

A request enters this state from the TOKEN state when a synchronization invitation has been sent to the buddy, and the local user is waiting for an incoming connection or a NAK message from the buddy.

A request leaves this state in four ways: (1) to DELAY—if in a given amount of time neither a NAK, an SNM, or a connection is received by the local user from the buddy then the request times out and moves to the DELAY state; (2) to NOTOKEN—if a NAK is received by the local user from the buddy then the local user stops listening for an incoming connection and the request enters the NOTOKEN state; (3) to CONNECTED—if an incoming connection is made by the buddy to the local user then the synchronization request moves to the CONNECTED state; and (4) to WAIT_OUT—if a Synchronization Invitation (SNM Message) is received from the buddy by the local user then the request moves to WAIT_OUT such that an outgoing connection to the buddy can be scheduled. In this case the request does not go to the INVITED state because the scheduler in the TOKEN state already allocated a connection for this buddy, since it was the local user that originally sent the synchronization invitation to the buddy.

WAIT OUT

A request enters this state when an invitation to synchronize has been received by the local user from the buddy and an outgoing connection has been scheduled and the local user is waiting for it to be established. Once the connection is established the request goes to the CONNECTED state.

A request can enter this state in two ways: (1) from WAIT_IN—when a local user is listening for an incoming connection or NAK from the buddy and instead they received an SNM message, the request moves from the WAIT_IN state to the WAIT_OUT state—in this case, the INVITED state is skipped because in the TOKEN state a connection was already allocated for this buddy; and (2) from INVITED—when the scheduler approves a request to connect to a buddy then it enters the WAIT_OUT state from the INVITED state.

A request can leave this state in two ways: (1) to CONNECTED—if a connection with the buddy has been successfully established; and (2) to DELAY—if establishing a connection with the buddy has timed out.

CONNECTED

In this state there is a full bidirectional connection established between the local user and a buddy.

A request enters this state in three ways: (1) From WAIT_IN—When the local user was listening for an incoming connection, the request will enter the CONNECTED state from the WAIT_IN state once a connection has been established; from WAIT_OUT—when a connection has been initiated by the local user, the request will enter the CONNECTED state from the WAIT_OUT state once the connection has been established; and (3) from DISCONNECTED—when a connection has been lost either due to a network issue, or the buddy logging off it will move to the DISCONNECTED state—when the connection is reestablished the request will move back to the CONNECTED state.

A request leaves this state in two ways: (1) to DISCONNECTED—a request leaves this state and moves to DISCONNECTED either because the buddy logged out, the local user is logging out or there are network issues which caused the connection to be lost; and (2) to NONE—once two users are finished synchronizing, the request moves from connected to NONE—once a request moves to NONE, it can be pruned and discarded.

DISCONNECTED

In this state the bidirectional connection has been lost between the local user and the buddy. This can be due to a network issue, or to the buddy signing out.

A request enters this state only from CONNECTED—when the connection to be buddy has been lost.

A request leaves this state in three ways: (1) to CONNECTED—if the connection to the buddy is reestablished then the request will move from DISCONNECTED to CONNECTED; (2) to DELAY—if the connection is unable to be reestablished and the request times out then it will move from DISCONNECTED to DELAY; and (3) to NONE—if the remote user signs out of Messenger then the request will move from DISCONNECTED to NONE.

DELAY

This state represents the case where something has gone wrong and a timeout has occurred. These timeouts can occur from the following four states, DISCONNECTED, WAIT_IN, WAIT_OUT and NOTOKEN. There are two ways to leave this state: (1) to INVITED—if while in DELAY an SNM is received by the local user from the buddy then they will go to the INVITED state from the DELAY state; and (2) to TOKEN—if the timed out request needs to be rescheduled, then it will go from DELAY to TOKEN.

Scheduling Operation

In operation, the scheduling function of the synchronization negotiation manager works as follow in accordance with one embodiment.

The scheduler runs when any input is received, after all relevant state transitions have occurred based on that input. In one embodiment, the scheduler honors two thresholds: a high and a low value. The difference between these two values is intended to provide a valence for incoming connections.

The first step the scheduler takes is to disconnect nodes one at a time while the number of currently active nodes (in the CONNECTED state) exceeds the low threshold. In one embodiment, only idle nodes (nodes in the CONNECTED state that are fully synchronized with their buddies) will be disconnected. In an alternate embodiment, nodes in the CONNECTED state may be disconnected even if they are not fully synchronized with their buddies; this type of preemption can be useful to prevent a few long-running synchronizations from blocking all other synchronization traffic.

The scheduler then proceeds to handle nodes in the INVITED state. If there are less nodes active (i.e. in states WAIT_IN, WAIT_OUT, CONNECTED, or DISCONNECTED) than the high threshold, the invited node will be transitioned to WAIT_OUT and a connection will be initiated. If it can make room by disconnecting an idle node, it will do so. If there is not room under the high threshold, the invitation will be rejected and the node transitioned to the TOKEN state. The one exception to this rule is referred to as a generation count. Specifically, if an invitation has been rejected a large or pre-defined number of times, the threshold will be ignored and the connection will be forced. The generation count is embodied by the numeric value of the token described previously.

After processing the invites, the scheduler will deal with nodes in the TOKEN state. As many nodes as can fit under the high threshold will send an SNM invitation, be configured to receive incoming connections and transition to the WAIT_IN state. Again, idle nodes will be disconnected as necessary to make room under the high threshold.

CONCLUSION

Various embodiments can utilize a distributed solution for scheduling connections between peers in a file sharing environment. In accordance with at least some embodiments, individual nodes in a peer-to-peer system include scheduling software that enables the nodes to make scheduling decisions with regards to how, when and where connections are made with other peers. Scheduling decisions can be based on a number of different parameters.

In at least some embodiments, a synchronization negotiation manager is embodied with logic that drives the negotiation and scheduling process. This logic is represented by an innovative state machine that is designed to implement the negotiation and synchronization process.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
   receiving an indication that a user has logged-in to a computing device;
   responsive to the indication, sending, via a peer-to-peer connection, presence information to another user with whom a file sharing relationship exists, the presence information being maintained at the computing device;
   receiving, from the another user with whom the file sharing relationship exists, an invitation to synchronize files;
   evaluating, on the computing device, one or more parameters to ascertain whether or not a file sharing connection can be established, wherein the evaluating determines whether or not the file sharing connection can be established by utilizing a synchronization negotiation manager to monitor the one or more parameters that result from file sharing relationships with at least one other computing device;
   establishing, using the computing device, the file sharing connection in an event said evaluating indicates that the file sharing connection can be established;
   not establishing the file sharing connection in an event said evaluating indicates that the file sharing connection cannot be established; and
   in an event the file sharing connection is not established:
      informing the another user that the computing device will send a separate invitation to synchronize, at a later time, to the another user;
      utilizing a token to ensure the file sharing connection is established, wherein the token maintains a count of how many times the user and the another user have attempted to synchronize; and
      in an event the token reaches a predetermined limit, forcing establishing the file sharing connection to ensure that the files are synchronized.

2. The method of claim 1, wherein the act of not establishing comprises sending a negative acknowledgement message to the another user.

3. The method of claim 1, wherein one of said one or more parameters comprises pre-computed parameters.

4. The method of claim 3, wherein said pre-computed parameters comprise one or more of: the number of incoming connections, or the number of outgoing connections.

5. The method of claim 1, wherein one of said one or more parameters comprises an activity type that is taking place between the user and the another user attempting to establish the file sharing relationship.

6. The method of claim 5, wherein one activity type pertains to whether the user and the another user are actively engaging one another.

7. The method of claim 1, wherein one of said one or more parameters comprises a load on the computing device or the computing device's network connection.

8. The method of claim 1, wherein one of said one or more parameters comprises synchronization staleness.

9. The method of claim 1, wherein one of said one or more parameters comprises a connection priority.

10. The method of claim 9, wherein the connection priority is computed using the token representing a number of synchronization attempts corresponding to the count.

11. The method of claim 9, wherein the connection priority is computed using an activity type that describes an activity that is taking place between the user and the another user for which the file sharing connection is desired.

12. The method of claim 9, wherein the connection priority is computed using an activity type comprising network proximity or previous synchronization history.

13. A system comprising:
   one or more computer-readable storage media; and
   computer-readable instructions stored on the one or more computer-readable media that, when executed by a processor, perform acts comprising:
   receiving an indication that a user has logged-in to a computing device;
   responsive to the indication, sending, via a peer-to-peer connection, presence information to another user with whom a file sharing relationship exists, the presence information being maintained at the computing device;
   receiving, from the another user with whom the file sharing relationship exists, an invitation to synchronize files;
   evaluating, on the computing device, one or more parameters to ascertain whether or not a file sharing connection can be established, wherein the evaluating determines whether or not the file sharing connection can be established by utilizing a synchronization negotiation manager to monitor the one or more parameters that result from file sharing relationships with at least one other computing device;
   establishing, using the computing device, the file sharing connection in an event said evaluating indicates that the file sharing connection can be established;
   not establishing the file sharing connection in an event said evaluating indicates that the file sharing connection cannot be established; and
   in an event the file sharing connection is not established;
   informing the another user that the computing device will send a separate invitation to synchronize, at a later time, to the another user;

utilizing a token to ensure the file sharing connection is established, wherein the token maintains a count of how many times the user and the another user have attempted to synchronize; and in an event the token reaches a predetermined limit, forcing establishing the file sharing connection to ensure that the files are synchronized.

14. The system of claim 13, wherein the computer-readable instructions implement a state machine having a plurality of inputs, a plurality of actions and a plurality of states that pertain to synchronization activities.

15. The system of claim 14, wherein said inputs comprise at least one of:

a sign-in/local changes input which can be spawned by when a buddy signs in or when there are local changes on the file system;

a schedule input that is spawned by a scheduling action of a synchronization negotiation manager that evaluates whether to accept invitations and establish new connections, or whether to disconnect existing connections;

a synchronization negotiation message (SNM) received input that indicates that a synchronization invitation message has been received;

a negative acknowledgement (NAK) received input that indicates that a synchronization invitation decline message has been received;

a connection lost input that is called when a connection to a buddy has been terminated or lost;

a connection established input that is called when a connection to a buddy has been established;

a connection re-established input that is called when a previously established connection to a buddy that was lost or terminated before synchronization could complete has been re-established; or a timeout input that indicates that a state has reached the maximum allowable time and an action and state transition needs to be performed.

16. A system comprising:

one or more computer-readable storage media;

computer-readable instructions on the one or more computer-readable media that, when executed by a processor, causes a node in a file-sharing environment to manage and oversee the number of concurrent file-sharing connections the node has open at any one time by managing synchronization invitations and connections, wherein the computer-readable instructions further implements a state machine having a plurality of inputs, a plurality of actions and a plurality of states that pertain to synchronization activities, wherein said states comprise:

a NONE state in which a request is placed when a buddy with whom synchronizing is taking place goes offline or is fully synchronized;

a TOKEN state in which synchronization invitation messages are queued to be sent to an appropriate remote user when there is new local content available;

a NOTOKEN state in which a synchronization request is placed if a synchronization invitation decline message is received from a buddy responsive to a synchronization invitation message being sent;

an INVITED state which is entered while waiting for a scheduler to approve or deny a connection;

a WAIT_IN state in which a request is placed from the token state when a synchronization invitation message has been sent to a buddy and the local user is waiting for an incoming connection, or a synchronization invitation decline message has been received from the buddy;

a WAIT_OUT state in which a request is entered when a synchronization invitation message has been received by the local user from a buddy and an outgoing connection has been scheduled and the local user is waiting for the connection to be established;

a CONNECTED state in which there is a full bidirectional connection established between the local user and a buddy;

a DISCONNECTED state that is entered when the bidirectional connection has been lost between the local user and a buddy; and a DELAY state that is entered when a time out has occurred.

17. One or more computer-readable storage media comprising computer-readable instructions that, when executed by a processor, perform acts comprising:

receiving an indication that a user has logged-in to a computing device;

responsive to the indication, sending, via a peer-to-peer connection, presence information to another user with whom a file sharing relationship exists, the presence information being maintained at the computing device;

receiving, from the another user with whom the file sharing relationship exists, an invitation to synchronize files;

evaluating, on the computing device, one or more parameters to ascertain whether or not a file sharing connection can be established, wherein the evaluating determines whether or not the file sharing connection can be established by utilizing a synchronization negotiation manager to monitor the one or more parameters that result from file sharing relationships with at least one other computing device;

establishing, using the computing device, the file sharing connection in an event said evaluating indicates that the file sharing connection can be established;

not establishing the file sharing connection in an event said evaluating indicates that the file sharing connection cannot be established; and in an event the file sharing connection is not established:

informing the another user that the computing device will send a separate invitation to synchronize, at a later time, to the another user;

utilizing a token to ensure the file sharing connection is established, wherein the token maintains a count of how many times the user and the another user have attempted to synchronize; and in an event the token reaches a predetermined limit, forcing establishing the file sharing connection to ensure that the files are synchronized.

\* \* \* \* \*